US010397559B2

(12) United States Patent
Li et al.

(10) Patent No.: US 10,397,559 B2
(45) Date of Patent: Aug. 27, 2019

(54) DISPLAY METHOD, DISPLAY APPARATUS, AND DISPLAY SYSTEM

(71) Applicant: BOE TECHNOLOGY GROUP CO., LTD., Beijing (CN)

(72) Inventors: Wenbo Li, Beijing (CN); Guangtao Zhai, Beijing (CN); Zhongpai Gao, Beijing (CN); Jian Gao, Beijing (CN); Yingyi Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/323,423

(22) PCT Filed: May 20, 2016

(86) PCT No.: PCT/CN2016/082897
§ 371 (c)(1),
(2) Date: Jan. 1, 2017

(87) PCT Pub. No.: WO2017/096757
PCT Pub. Date: Jun. 15, 2017

(65) Prior Publication Data
US 2018/0270476 A1 Sep. 20, 2018

(30) Foreign Application Priority Data

Dec. 7, 2015 (CN) .......................... 2015 1 0891663

(51) Int. Cl.
H04N 13/337 (2018.01)
H04N 13/167 (2018.01)
(Continued)

(52) U.S. Cl.
CPC ........... *H04N 13/337* (2018.05); *G06F 3/147* (2013.01); *G09G 5/026* (2013.01); *G09G 5/14* (2013.01);
(Continued)

(58) Field of Classification Search
CPC combination set(s) only.
See application file for complete search history.

(56) References Cited

U.S. PATENT DOCUMENTS 9,578,314 B2    2/2017  Wu et al.
2010/0079676 A1* 4/2010  Kritt ..................... G06F 3/1431
                                                       348/598
(Continued)

FOREIGN PATENT DOCUMENTS

CN    104796686 A    7/2015
CN    104869385 A    8/2015
CN    104881699 A    9/2015

OTHER PUBLICATIONS

International Search Report and Written Opinion dated Aug. 30, 2016 in PCT/CN2016/082897.
(Continued)

Primary Examiner — Alexander Gee
(74) Attorney, Agent, or Firm — Syncoda LLC; Feng Ma

(57) ABSTRACT

A display method includes: processing a plurality of images to form base compositions; and presenting the base compositions with different images in a spatial arrangement which as a whole form a composite image viewable to a naked-eye viewer; wherein a subset of the plurality of images are selectively viewable as a modulated view to a user with an optical modulation device.

20 Claims, 10 Drawing Sheets

(51) Int. Cl.

| | | |
|---|---|---|
| | *H04N 13/351* | (2018.01) |
| | *G09G 5/14* | (2006.01) |
| | *G09G 5/02* | (2006.01) |
| | *G06F 3/147* | (2006.01) |
| | *H04N 13/30* | (2018.01) |
| | *H04N 13/156* | (2018.01) |

(52) U.S. Cl.
CPC ......... *H04N 13/156* (2018.05); *H04N 13/167* (2018.05); *H04N 13/351* (2018.05); *G09G 2358/00* (2013.01); *H04N 2013/405* (2018.05)

(56) References Cited

U.S. PATENT DOCUMENTS

| | | | | |
|---|---|---|---|---|
| 2010/0208985 | A1* | 8/2010 | Lee | H04N 1/40012 |
| | | | | 382/163 |
| 2011/0310221 | A1* | 12/2011 | Meuninck | H04N 13/341 |
| | | | | 348/43 |
| 2016/0148563 | A1* | 5/2016 | Tsuge | G09G 3/3225 |
| | | | | 345/76 |
| 2017/0039910 | A1* | 2/2017 | Fan | G09G 3/003 |

OTHER PUBLICATIONS

1st Office Action dated Aug. 2, 2016 in CN Appl. No. 201510891663.1.

2nd Office Action dated Oct. 31, 2016 in CN Appl. No. 201510891663.1.

3rd Office Action dated Apr. 1, 2017 in CN Appl. No. 201510891663.1.

* cited by examiner

101 Obtaining pixel gray scale values $X_1$ corresponding to the even-numbered rows of pixels; and mapping the $X_1$ into $X_1'$ in a luminance domain.

102 Obtaining pixel gray scale values $Y_0$ of the composite image corresponding to the odd-numbered rows of pixels and the even-numbered rows of pixels in the luminance modulation regions; and mapping $Y_0$ into $C$ in the luminance domain; wherein $C$ is a constant.

103 In the luminance domain, calculating luminance values $X_2'$ corresponding to the odd-numbered rows of pixels in the luminance modulation regions, wherein $X_2' = C - X_1'$; and mapping $X_2'$ into $X_2$ in a gray scale domain, wherein $X_2$ are gray scale values of the odd-numbered rows of pixels, wherein $X_1'$ and $X_2'$ are non-negative values.

FIG. 3A

DISPLAY METHOD, DISPLAY APPARATUS, AND DISPLAY SYSTEM

CROSS-REFERENCES TO RELATED APPLICATION

The present application claims priority to Chinese Patent Application No. 201510891663.1 filed on Dec. 7, 2015, the disclosure of which is hereby incorporated by reference in its entirety.

TECHNICAL FIELD

The present disclosure relates to display technologies, and more specifically relates to a display method, display apparatus, and display system.

BACKGROUND

With the ever growing popularity of display devices, information security of the display devices has become a focus of attention, and anti-peeping has been referred to as one of the most important factors in information security.

The higher brightness, larger viewing angles, and higher resolutions of modern display screens tend to make it easier for onlookers to view the content on the screens from a side of the user or behind the user's back, even though they are not authorized to view the content.

SUMMARY

Embodiments disclosed herein provide a display method, a display apparatus, and a display system, allowing for multi-displays on a single screen, and solving problems that cannot be overcome by conventional time-division multiplexing methods. Such problems may include inadequate screen brightness, and lack of sufficient number of images that can be generated.

In an aspect, a display method is provided, including: processing a plurality of images to form base compositions; and presenting the base compositions with different images in a spatial arrangement which as a whole form a composite image viewable to a naked-eye viewer; wherein a subset of the plurality of images are selectively viewable as a modulated view to a user with an optical modulation device.

In some embodiments, the presenting base compositions with different images at the spatial arrangement comprises presenting the base composition containing different images according to a display pixel row arrangement.

In some embodiments, the presenting the base compositions containing different images according to a display pixel row arrangement comprises: presenting a first group of the base compositions at odd-numbered rows of pixels; and presenting a second group of the base compositions at even-numbered rows of pixels.

In some embodiments, luminance of the even-numbered rows of pixels correspond to the modulated view.

In some embodiments, a sum of the luminance of the even-numbered rows of pixels and luminance of odd-numbered rows of pixels adjacent to the even-numbered rows of pixels correspond to the composite image.

In some embodiments, the method further includes: obtaining pixel gray scale values $X_1$ corresponding to the even-numbered rows of pixels; and mapping the $X_1$ into $X_1'$ in a luminance domain.

In some embodiments, the method further includes: obtaining pixel gray scale values $Y_0$ of the composite image corresponding to the odd-numbered rows of pixels and the even-numbered rows of pixels in the luminance modulation regions; and mapping $Y_0$ into C in the luminance domain; wherein C is a constant.

In some embodiments, the method further includes: in the luminance domain, calculating luminance values $X_2'$ corresponding to the odd-numbered rows of pixels in the luminance modulation regions, wherein $X_2'=C-X_1$; and mapping $X_2'$ into $X_2$ in a gray scale domain, wherein $X_2$ are gray scale values of the odd-numbered rows of pixels, wherein $X_1'$ and $X_2'$ are non-negative values.

In some embodiments, $X_1$ have a dynamic range defined in a second gray scale region, $Y_0$ have a dynamic range defined in a first gray region, wherein values contained in the first gray scale region are all greater than values contained in the second gray scale region, and wherein the values of the first and second gray scale regions constitute the gray scale domain.

In some embodiments, $Y_0$, $X_1$, and $X_2$ together have a dynamic range of [0, 255], wherein $Y_0$ have a dynamic range limited to [128, 255], and $X_1$ have a dynamic range limited to [0, 127].

In some embodiments, the composite image is a gray scale image configured to conceal the modulated view.

In some embodiments, the composite image is an apparently meaningful image to the naked-eye viewer.

In some embodiments, for any region, the presented base compositions are common compositions of multiple images.

In some embodiments, for any region, the presented base compositions are compositions of one image.

In some embodiments, the method further includes: dividing the base compositions into a plurality of regions; and modulating pixel luminance in at least some of the plurality of regions to form a plurality of luminance modulation regions; wherein the optical modulation device is configured to integrate at least some of the plurality of regions into the modulated view.

In some embodiments, the method further includes: providing the composite image without modulating pixel luminance to form a disguise view; wherein the disguise view is different from the modulated view.

In some embodiments, the method further includes: executing the method on a mobile terminal operating system.

In some embodiments, the mobile terminal operating system comprises an Android system.

In some embodiments, the modulating pixel luminance in at least some of the plurality of regions comprises: providing a weight vector W, wherein the base compositions are expressed as $X_1, X_2, \ldots, X_M$, wherein W has N rows and M columns, and comprises M×N weight factors, wherein M corresponds to a number of the base compositions, and N corresponds to a number of different optical modulation devices.

In another aspect, a tangible, non-transitory, computer-readable storage medium is provided having instructions stored thereon that, when executed by one or more processors, cause the one or more processors to perform operations including: processing a plurality of images to form base compositions; and presenting the base compositions with different images in a spatial arrangement which as a whole form a composite image viewable to a naked-eye viewer; wherein a subset of the plurality of images are selectively viewable as a modulated view to a user with an optical modulation device.

In some embodiments, the computer-readable storage medium further includes instructions stored thereon that, when executed by the one or more processors, cause the one or more processors to perform additional operations including: obtaining pixel gray scale values $X_1$ corresponding to even-numbered rows of pixels; and mapping the $X_1$ into $X_1'$ in a luminance domain.

In some embodiments, the computer-readable storage medium further includes instructions stored thereon that, when executed by the one or more processors, cause the one or more processors to perform additional operations including: obtaining pixel gray scale values $Y_0$ of the composite image corresponding to odd-numbered rows of pixels and the even-numbered rows of pixels in the luminance modulation regions; and mapping $Y_0$ into C in the luminance domain; wherein C is a constant.

In some embodiments, the computer-readable storage medium further includes instructions stored thereon that, when executed by the one or more processors, cause the one or more processors to perform additional operations including: in the luminance domain, calculating luminance values $X_2'$ corresponding to the odd-numbered rows of pixels in the luminance modulation regions, wherein $X_2'=C-X_1'$; and mapping $X_2'$ into $X_2$ in a gray scale domain, wherein $X_2$ are gray scale values of the odd-numbered rows of pixels, wherein $X_1'$ and $X_2'$ are non-negative values.

In some embodiments, $X_1$ have a dynamic range defined in a second gray scale region, $Y_0$ have a dynamic range defined in a first gray region, values contained in the first gray scale region are all greater than values contained in the second gray scale region, and the values of the first and second gray scale regions constitute the gray scale domain.

In some embodiments, $Y_0$, $X_1$, and $X_2$ together have a dynamic range of [0, 255], $Y_0$ have a dynamic range limited to [128, 255]; $X_1$ have a dynamic range limited to [0, 127]; and the composite image is a gray scale image configured to conceal the modulated view.

In some embodiments, the computer-readable storage medium further includes instructions stored thereon that, when executed by the one or more processors, cause the one or more processors to perform additional operations including: dividing the base compositions into a plurality of regions; and modulating pixel luminance in at least some of the plurality of regions to form a plurality of luminance modulation regions; wherein: the optical modulation device is configured to integrate at least some of the plurality of regions into the modulated view; the modulating pixel luminance in at least some of the plurality of regions comprises: providing a weight vector W, wherein: the base compositions are expressed as $X_1, X_2, \ldots X_M$; W has N rows and M columns, and comprises M×N weight factors; M corresponds to a number of the base compositions; and N corresponds to a number of different optical modulation devices.

In another aspect, a display apparatus is provided, including a plurality of pixels and configured to: process a plurality of images to form base compositions; and present the base compositions with different images in a spatial arrangement which as a whole form a composite image viewable to a naked-eye viewer; wherein a subset of the plurality of images are selectively viewable as a modulated view to a user with an optical modulation device.

In some embodiments, the composite image is an apparently meaningful image to the naked-eye viewer.

In some embodiments, the composite image comprises only a constant or noise.

In another aspect, a display system is provided, including: the display apparatus; and the optical modulation device.

In some embodiments, the optical modulation device is configured to perform luminance modulation to the subset of the plurality of images to form the modulated view.

In some embodiments, the optical modulation device comprises at least one of optical modulation glasses, a head-up display, a helmet mounted display, a virtual reality device, and an augmented reality device.

In some embodiments, the display apparatus comprises an interlaced polarization display device; wherein the optical modulation device comprises optical modulation glasses with polarization directions consistent with polarization directions of even-numbered rows of pixels.

In some embodiments, the display apparatus comprises an interlaced polarization display device; wherein the optical modulation device comprises optical modulation glasses with polarization directions consistent with polarization directions of odd-numbered rows of pixels.

Other embodiments and implementations may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

FIG. 3A is a flow chart of a method of providing a display method according to some embodiments;

DETAILED DESCRIPTION

Figure 1:
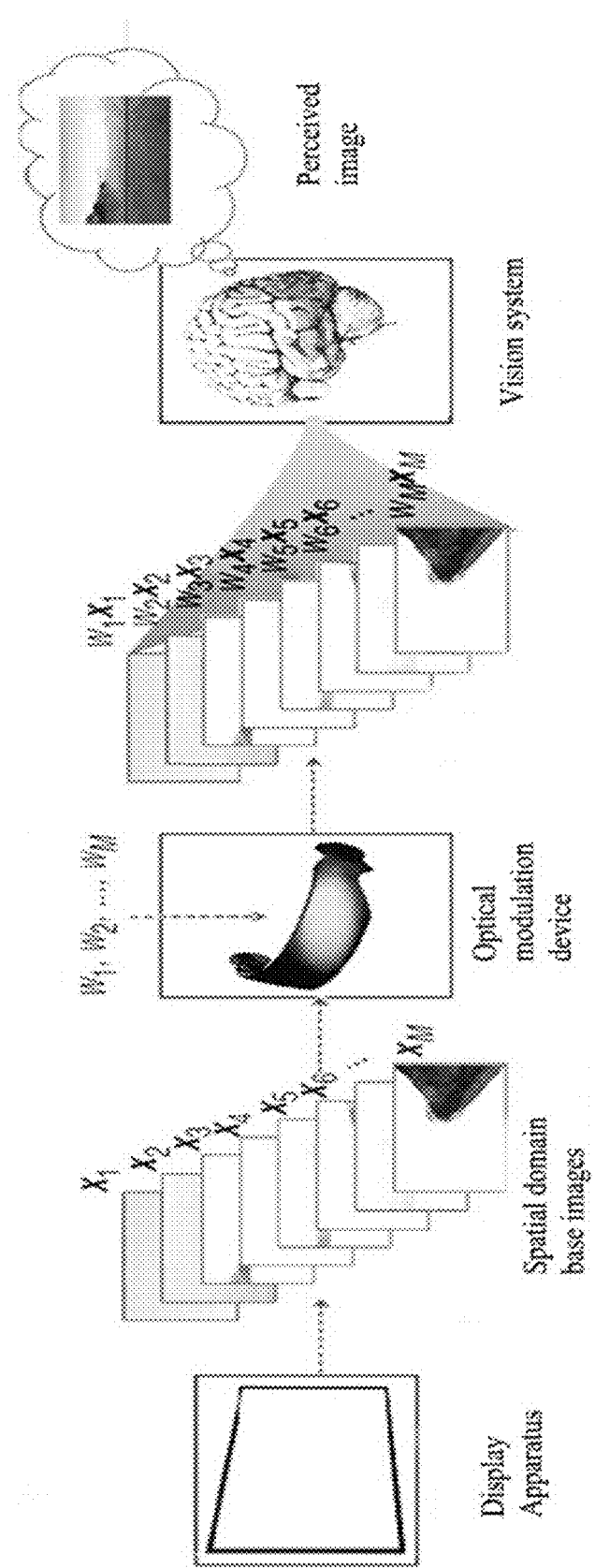
FIG. 1 is a first diagram illustrating the principles of a display method according to an embodiment.

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), without any inventive work, which come(s) within the scope sought for protection by the disclosure.

Various anti-peeping techniques can be adopted in display technologies. For example, psychovisual modulation (PVM) techniques can be adopted in anti-peeping display technologies.

PVM employs the following psychophysical visual principles: the brain's Human Visual System (HVS) cannot distinguish rapidly-changing optical signals faster than the flicker fusion frequency (for most observers, this frequency is around 60 Hz). However, mainstream LCD displays can have 120 Hz, 240 Hz or even higher refresh rates. Other types of light modulators can have higher refresh rates. For example, a digital projector employing shape-variable mirrors and grating light switches can have a refresh rate of 88 kHz or higher, as well as high spatial resolutions.

As such, a high-speed optoelectronic display in the visible spectrum can send visual stimuli a lot more than any viewers can absorb.

Time division multiplexing technologies can be employed to extract the PVM capacities of high-speed display devices. For example, using dual or multi-picture displays employing time division multiplexing technologies, a display apparatus can provide pictures to two or more viewers wearing synchronous LCD glasses at different time intervals.

However, due to that the time division multiplexing technologies ignore correlations among images being displayed, the high-speed display device cannot be effectively used with respect to the mental visual redundancy of the human eyes. For example, the effective number of viewers can only linearly increase with the refresh rate of the display device, fewer images can be generated, and the luminance of the obtained pictures linearly decreases with the increased number of images. As such, in these approaches, when simultaneously used by two or more users, the picture quality may suffer significantly.

The present disclosure provides a display method, device, and a system. A multi-screen display can be realized, and many problems caused by the time-division multiplexing method can be solved, such as the lack of picture brightness, and the too few number of images generated, etc.

The display methods, display apparatuses and display systems according to some embodiments exploit the extra or redundant capacity of the display apparatuses. For example, various embodiments disclosed herein allow for multi-displays on a single screen, and solve problems that cannot be overcome by time-division multiplexing methods. Such problems may include inadequate screen brightness, and lack of sufficient numbers images that can be generated.

A display method according to some embodiments can include: presenting base compositions containing different images at a specific spatial arrangement, wherein for any region, the presented base compositions are the common compositions of multiple images, or compositions of one image. If the abovementioned base compositions are first divided into regions to adjust luminance, the user's visual system can integrate them into a modulated view. If the abovementioned base compositions are directly integrated into the user's visual system, a naked-eye view can be obtained which is different from the modulated view. In some embodiments, the naked-eye view can be a constant luminance value displayed on the screen, and the naked-eye viewer only sees a blank screen or a dark screen. In some embodiments, the naked-eye viewer only sees noise on the screen. In some other embodiments, the naked-eye view can include meaningful videos/pictures as designed. In some cases, the naked-eye view provides default views to a large number of audiences. In some other cases, the naked-eye view is designed to disguise the hidden secure information, and distract/confuse onlookers.

In some embodiments, Temporal PVM (TPVM) can be employed. In some embodiments, PVM can be extended into the spatial domain, and Spatial PVM (SPVM) can be employed.

Various embodiments disclosed herein provide a display method. According to some embodiments, a display method comprises: presenting base compositions containing different images at a specific spatial arrangement, wherein for any region, the presented base compositions are the common compositions of multiple images, or compositions of one image. If the base compositions are first divided into regions to adjust brightness, the user's visual system can integrate them into a modulated view. If the abovementioned base compositions are directly integrated into the user's visual system, a naked-eye view can be obtained which is different from the modulated view.

The base compositions according to some embodiments can be part of an image, can be displayed by the display device, and can be extracted. For example, the base compositions can be expressed as a gray scale of one or some of the pixels. A display method, with reference to FIG. 1, allows data substantively including different images (e.g., the base images) to be displayed on the display apparatus using the base compositions, wherein the base compositions corresponding to the same image are disposed according to specific spatial orientations, and the base compositions corresponding to different images are also arranged according to specific spatial orientations. The specific spatial orientations may be related to the specific luminance modulation methods. For any region, the presented base compositions are the common compositions of multiple images, or compositions of one image. If the base compositions are first divided into regions to adjust luminance, the user's visual system can integrate them into a modulated view. This is the user perceived image through auxiliary tools (e.g., an optical modulation device such as a luminance modulation device). If the base compositions go directly through the user's visual system, the user can observe an average brightness within a small region (the size of the region depends on the distance between the user's eyes and the display apparatus), and a naked-eye view can be obtained which is different from the modulated view.

The luminance modulation can be for a pre-divided region (e.g., the luminance modulation region), and the luminance modulation methods can be designed for the luminance modulation region. In particular, modulation of the perceived image can be realized through intensity modulation weight vector W and base composition groups $X_1$, $X_2, \ldots, X_M$. The modulation weight vector W can have N rows and M columns, and M×N weight factors, wherein M and N correspond to the number of base compositions, and the number of the optical modulation devices. At first the luminance modulation is performed by the optical modulation device, and the image enters into the user's visual system, and the human brain's perceived modulated view I is:

$$I_i = \sum_{j=1}^{M} X_j W_j^i$$

Without the luminance modulation, directly through the user's visual system the integrated naked-eye view can be expressed as: $Y_0=X_1+X_2+\ldots+X_M$.

The display method according to some embodiments allows the base image compositions including different images to be presented according to a specific spatial arrangement.

As such, by setting different luminance modulation parameters, a multi-screen display and improved picture brightness can be achieved. Further, the modulated images can only be viewed through a specific luminance modulation tool, such as an optical modulation device. Without the luminance modulation tool, other viewers can only see the naked-eye view that is different from the modulated view. If the modulated view is set to be the secure content, while the naked-eye view can be the non-secure content providing shielding of the secure content, and a display can be realized.

In some embodiments, the base compositions containing different images can be presented or broadcasted in a specific spatial arrangement. For example, the base compositions containing different images can be arranged based on the pixel rows of the display apparatus. In some embodiments, the first base composition group can be displayed in the odd-numbered rows of pixels of the display device; and the second group of base compositions can be displayed in the even-numbered rows of pixels. It is noted that the selections of the even-numbered rows of pixels or the odd-numbered rows of pixels, or in some cases the selections of different columns of pixels, can be interchangeable, and the definition of "rows" and "columns" can be relative.

In some other embodiments, the first group of base compositions can be displayed on the display apparatus in the even-numbered rows, and the second group of base compositions can be displayed on the display apparatus in the odd-numbered rows of pixels. In this case, it can be selected that the even-numbered rows of pixels have a 100% pass of the luminance, yet the odd-numbered rows of pixels have a 100% non-pass of the luminance. The sum of the luminance of the odd-numbered rows of pixels and the even-numbered rows of pixels correspond to the naked-eye view. Such a display method is illustrated in FIG. 3A, including:

101: Obtaining pixel gray scale values $X_1$ corresponding to the even-numbered rows of pixels; and mapping the $X_1$ into $X_1'$ in a luminance domain.

The even-numbered rows of pixels have their luminance values correspond to the luminance values of the modulated view as described above. Therefore, in principle at this step the image gray scale values $X_1$ corresponding to the even-numbered rows of pixels can be obtained from the modulated view and the luminance modulation method (mainly the weight vector modulation), and $X_1$ can be mapped into the luminance domain, referred to as $X_1'$.

102: Obtaining pixel gray scale values $Y_0$ of the composite image corresponding to the odd-numbered rows of pixels and the even-numbered rows of pixels in the luminance modulation regions; and mapping $Y_0$ into C in the luminance domain; wherein C is a constant.

In the case that the sum of the adjacent odd-numbered row pixel luminance and even-numbered row pixel luminance corresponds to the naked-eye view, the luminance modulation region is the sum of the adjacent odd-numbered row pixel luminance and even-numbered row pixel luminance, and the finally obtained values C in this step is the sum of the odd-numbered row pixel luminance and even-numbered row pixel luminance.

103: In the luminance domain, calculating luminance values $X_2'$ corresponding to the odd-numbered rows of pixels in the luminance modulation regions, wherein $X_2'=C-X_1'$; and mapping $X_2'$ into $X_2$ in a gray scale domain, wherein $X_2$ are gray scale values of the odd-numbered rows of pixels, wherein $X_1'$ and $X_2'$ are non-negative values.

Figure 3B:
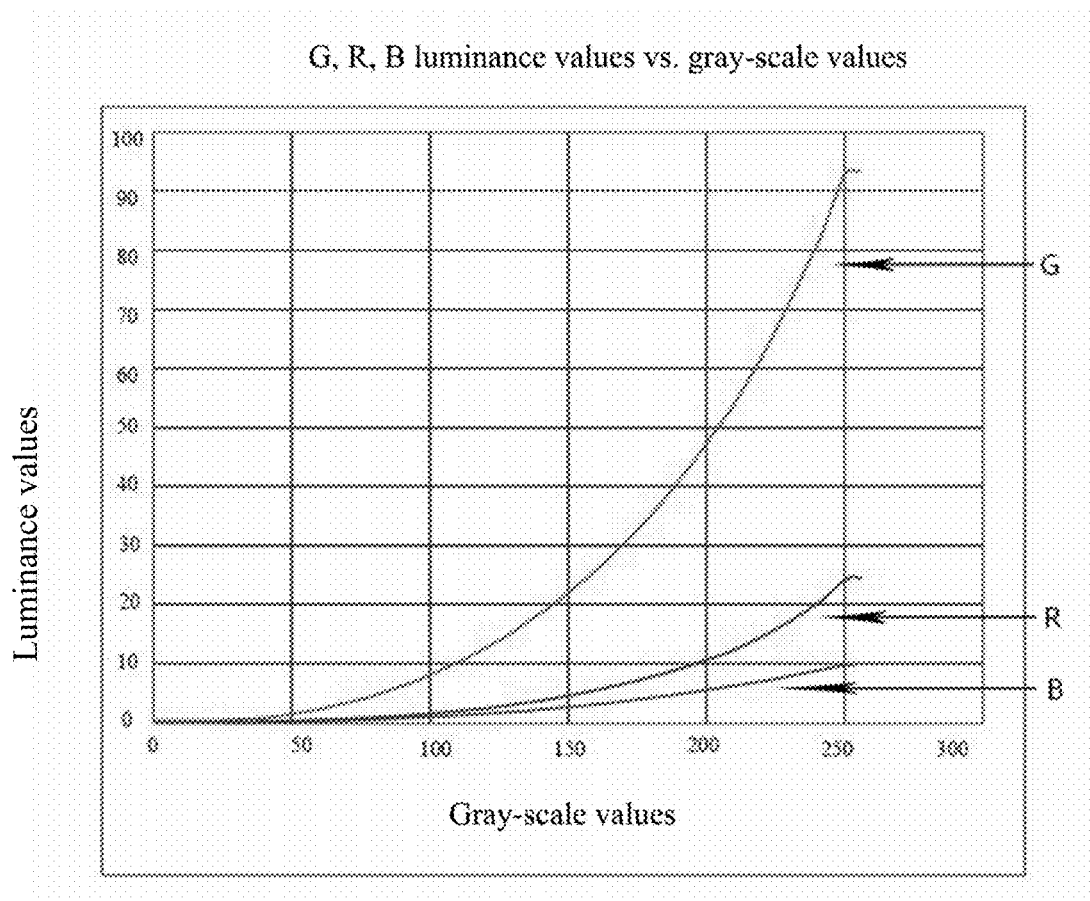
FIG. 3B illustrates an example of a nonlinear relationship between the G, R, B luminance values and the gray scale values.

It should be noted that, although the gray scale values correspond to the luminance values, they are not in a linear relationship. An example of such a nonlinear relationship is illustrated in FIG. 3B, where the G, R, B luminance values are plotted against the gray scale values.

Figure 3C:
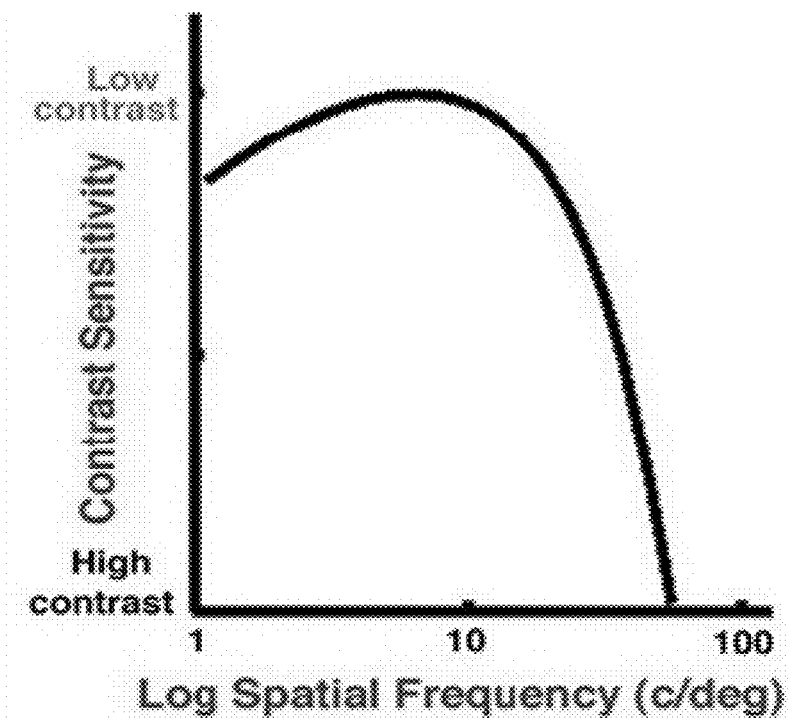
FIG. 3C illustrates a contrast sensitivity function employed according to some embodiments.

FIG. 3C illustrates a contrast sensitivity function employed according to some embodiments. The contrast sensitivity function includes parameters describing the capability of discerning the brightness/darkness in a static picture by the HVS.

Figure 3D:
FIG. 3D illustrates the effect of inversing the gray scale values as an approach for hiding secure information.

FIG. 3D illustrates the effect of inversing the gray scale values as an approach for hiding secure information.

As such, the gray scale values can be mapped into the luminance domain, and then calculated. For example, in this step, first in the luminance domain the luminance values $X_2'$ corresponding to the odd-numbered row pixels can be calculated, and then mapped to the gray scale domain, and the gray scale values $X_2$ can then be obtained for the odd-numbered rows of pixels.

In the display method according to some embodiments, if the modulated view and the naked-eye view are predetermined, the gray scale values of the odd-numbered rows of pixels can be set, allowing both the modulated view and naked-eye view to be meaningful to viewers. If the modulated view is set to be the secure image, the naked-eye view can be used to mask secure image. The naked-eye view can be a meaningful image to shield the secure image, and confuse the viewers. Wherein, in order to ensure that $X_2'=C-X_1'$ has a solution, the gray scale pixel values $X_1$, which correspond to the even-numbered rows of pixels of the modulated image, can have their dynamic range limited in the second gray scale regime, with the naked-eye view pixel gray scale values $Y_0$ having their dynamic range limited to the first gray scale regime. The values in the first gray scale regime can be all greater than the values contained in the second gray scale regime, and the values of the first gray scale regime and the second gray scale regime form the gray scale value domain. For example, the dynamic range of the gray scale value domain can be [0, 255], the dynamic range of $Y_0$ can be limited to [128, 255]; the dynamic range of $X_1$ can be limited to [0, 127].

In some embodiments, when the naked-eye view is used for masking the modulated view, the naked-eye view can be set as a simple gray scale image; and in this case C is a constant.

In some embodiments, prior to the steps of the above-described odd-numbered rows of pixels in the display device displaying the first group of base compositions, the even-numbered rows of pixels displaying the second group of the base compositions (step 101), the method further comprises: obtaining the naked-eye view, the modulated view, and a predetermined luminance modulation method for the modulated view. The luminance modulation method of the modulated view can be preset, such as preset in the display apparatus, or can be obtained when the display apparatus communicates with the optical modulation devices.

The display method according to some embodiments can realize multiple displays on a single screen, by setting different luminance modulation parameters. In addition, the luminance modulation can be in the context of redundant current pixels, and the luminance of some pixels when entering into the viewers' eyes can be artificially controlled to obtain relatively ideal picture brightness, thereby solving the problems present in the conventional time-division multiplexing methods. Such problems may include inadequate screen brightness, and lack of sufficient numbers images that can be generated. Further, the modulated view can only be viewed through specific optical modulation devices. Without obtaining the optical modulation devices, non-authorized viewers can only see the naked-eye view that is different from the modulated view. If the modulated view is set to be the secure content, the naked-eye view can be provided as non-secure content for shielding the secure content, and a secure display can be achieved.

Figure 2:
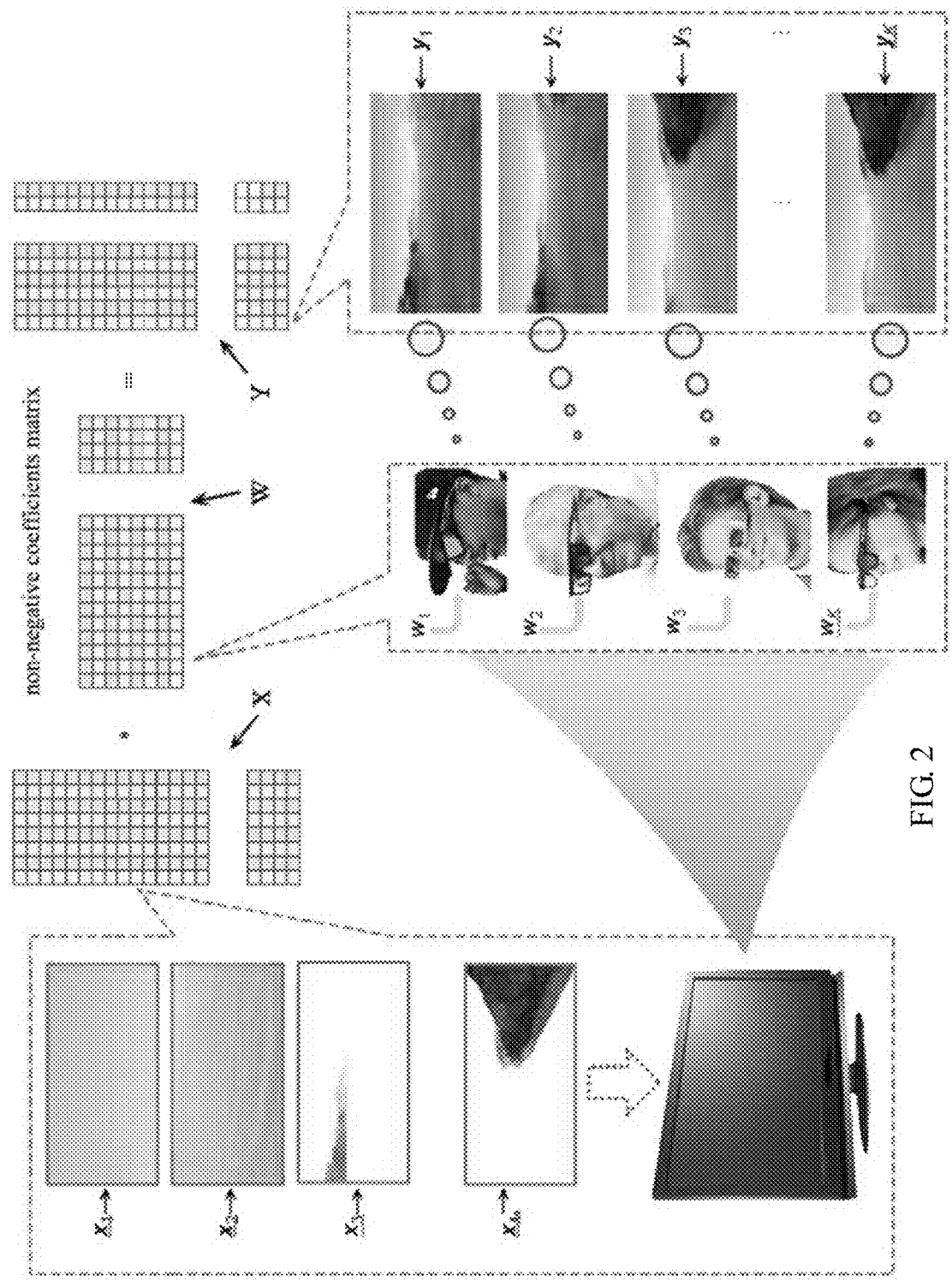
FIG. 2 is a second diagram illustrating the principles of the display method according to the embodiment.

Various embodiments also provide a display system, including a display apparatus, and one or more associated optical modulation devices. With reference to FIGS. 1 and 2, the display apparatus presents the base compositions containing different images with a specific spatial arrangement, wherein for any region, the presented base compositions are the common compositions of multiple images, or compositions of one image. If the base compositions are first divided into regions to adjust luminance, the user's visual system can integrate them into a modulated view. If the base compositions are directly integrated into a viewer's visual system, a naked-eye view can be obtained and is different from the modulated view. The optical modulation device can be in the form of an auxiliary viewing device, used in the luminance modulation for the base compositions luminance modulation by the divided regions. The optical modulation device can be, for example, in the form of luminance modulation glasses, Helmet-Mounted Displays (HMD), virtual reality (VR) devices, Head-Up Displays (HUD) etc.

The display apparatus according to some embodiments disclosed herein can simultaneously display different image contents, and achieve multiple displays on a single screen. In addition, as a result of pixel redundancy available in most display apparatuses, a relatively ideal picture brightness can be obtained. Various embodiments also provide an optical modulation device to function with the display apparatus, allowing the view of content different from the naked-eye view, thereby realizing that only authorized users can view modulated image.

In some embodiments, the display apparatus can be a mobile terminal such as a smart phone. The mobile terminal can have an operating system such as Android system, iOS, etc.

In some embodiments, the modulated view can be set to be the secure image, and the naked-eye view can be used to mask the secure image. The naked-eye view can be noise, a blank screen, a gray screen, a white screen, etc. However, such a simple masking can raise the suspicion of non-authorized viewers. As such, in some embodiments the naked-eye view can be a picture or video that appears to be meaningful, thereby better disguising the secure image. It is noted that the "naked-eye view" referred to herein includes the view from non-authorized users with conventional glasses, such as near-vision glasses, far-vision glasses, sun glasses, etc.

In some implementations, the display apparatus includes a display unit. The display unit can be configured to present the base compositions containing different images according to the pixel rows of the image display apparatus. For example, the display unit can be configured specifically to display the first group of base compositions at the odd-numbered rows of pixels, and display the second group of base compositions at the even-numbered rows of pixels. In some implementations, the display apparatus can be an interlaced polarization display apparatus, wherein the luminance of the even-numbered rows of pixels (or alternatively the luminance of the odd-numbered rows of pixels) corresponds to the modulated view, while the sum of the luminance of the odd-numbered rows of pixels and the luminance of the even-numbered rows of pixels corresponds to the naked-eye view. Correspondingly, the optical modulation device associated with the display apparatus allows only the luminance of the even-numbered rows of pixels (or alternatively allows only odd-numbered rows of pixels) to pass. That is, the polarization direction of the luminance modulation glasses is consistent with the polarization direction of the even-numbered rows of pixels (or odd-numbered rows of pixels).

Figure 4:
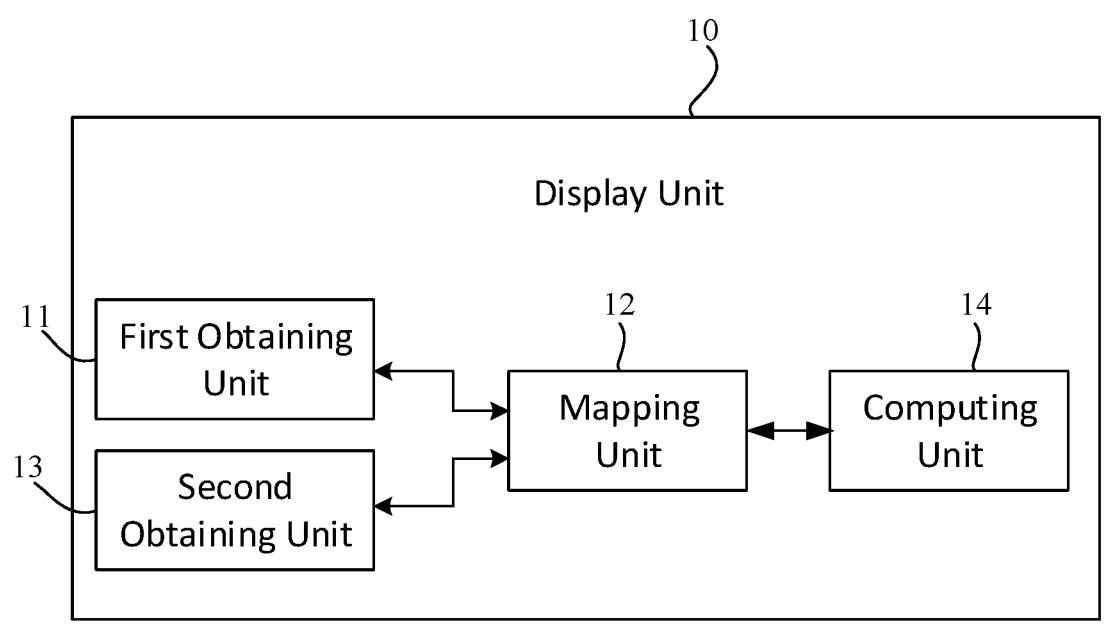
FIG. 4 is a block diagram of a display apparatus according to some embodiments.

In the case that the luminance of the even-numbered rows of pixels corresponds to the modulated view, and the sum of the luminance of the odd-numbered rows of pixels and the luminance of the even-numbered rows of pixels corresponds to the naked-eye view, as shown in FIG. 4, the display unit 10 includes: a first obtaining unit 11 configured to, based on the modulated view and its luminance modulation method, obtain the even-numbered rows of pixels gray scale values $X_1$; a mapping unit 12, configured to map $X_1$ into the luminance value domain, represented by $X_1'$; a second obtaining unit 13 configured to, based on the naked-eye view, obtain the gray scale values $Y_0$, corresponding to the luminance modulation region of the even-numbered rows of pixels and the odd-numbered rows of pixels.

The mapping unit 12 is also configured to map the gray scale values $Y_0$ into the luminance range, represented by C. The display unit 10 can further comprise a computing unit 14 configured to, in the luminance domain, calculate the luminance values $X_2'$ corresponding to the odd-numbered rows of pixels in the luminance modulation region, where $X_2'=C-X_1'$. The mapping unit 12 can also be configured to map $X_2'$ into the gray scale value domain, to obtain the corresponding gray scale values $X_2$, wherein $X_1'$, $X_2'$ are non-negative numbers; and wherein $X_1$ have a dynamic range limited to the second gray scale regime, $Y_0$ have a dynamic range limited to the first gray scale regime. The values in the first gray scale regime can be all greater than the values contained in the second gray scale regime, and the values of the first gray scale regime and the second gray scale regime form the gray scale value domain.

Various embodiments also provide a display system, including a display apparatus configured to present the base compositions containing different images at a specific spatial arrangement, wherein for any region, the presented base compositions are the common compositions of multiple images, or compositions of one image. The system also includes one or more optical modulation devices configured to function with the display apparatus. The optical modulation device cans be configured to divide the base compositions into regions to perform luminance modulation, and the modulated information, through the user's visual system, can integrate into a modulated view. On the other hand, if the base compositions are directly integrated into the user's visual system, a naked-eye view can be obtained which is different from the abovementioned modulated view.

The display systems therefore allow authorized users with the optical modulation devices and the naked-eye viewers to see different picture information. For example, the authorized users with the optical modulation devices can see the hidden information (modulated view), yet the unauthorized naked-eye viewers can only see the camouflage information provided (the naked-eye view).

Advantageously, various embodiments disclosed herein provide a more display method compared to other methods. For example, some conventional "secure" display apparatuses simply limit the usable viewing angle of the screen to prevent onlookers seeing the displayed content over the user's shoulder or from a side. However, this approach cannot prevent onlookers from peeking right from behind the user, and the reduced viewing angle may also become a problem to the authorized viewer. In contrast, various embodiments disclosed herein do not need to limit the user's viewing angles. Further, a naked-eye view can provide some apparently-meaningful pictures to the onlookers, and the onlookers are less likely to suspect that the user is actually viewing some different, private, pictures.

In some other embodiments, a security display method and a display apparatus are provided using redundant pixels to realize secure displays, employing SPVM principles. Current display devices have much higher pixel densities than the human retina resolutions. For example, mainstream LCD screens can provide a 1920×1080 HD or even higher resolution. However, under normal viewing conditions, the resolution limit of the human eyes is about 300 PPI. In most cases, viewers usually view the screens at a distance exceeding the optimum viewing distance, resulting in many redundant pixels.

For existing interlaced polarization-based passive stereoscopic display devices, in order to create a 3D illusion, odd and even-numbered rows of scanning lines are polarized in different directions. When using of a pair of matching left and right eye modulation glasses with different directions of polarizations, the viewer can see the 3D illusion. Usually this types of screens have very high resolutions such that the human visual system cannot distinguish between left and right eye images of pixel shifting, thereby allowing such a display device to display a pair of frames on the odd and even rows.

A display system can also be built upon such a stereoscopic display apparatus, e.g., the polarization interlaced display device. The associated display method can be realized as follows: the optical modulation device can employ a pair of modulation glasses with the left and right eyes in the same direction of polarization. Defining the picture viewed using the modulation glasses as the modulated view, the picture seen directly by the naked eyes or with conventional vision-correction glasses as the naked-eye view. The display method according to some embodiments includes sending the images $X_1$ and $X_2$ respectively at the odd-numbered rows of pixels and the even-numbered rows of pixels, using a pair of modulation glasses to match the even-numbered rows, and the image $X_1$ corresponding to the even-numbered row pixels can be seen through the modulation glasses, while through the naked eyes or only with conventional vision-correction glasses the image corresponding to the sum of the luminance of adjacent odd and even lines can be seen, i.e., the naked-eye view $Y_0=X_1+X_2$.

Based on the above, some embodiments can also provide a method of concealing information. For example, in the modulated view, picture $X_1$ can be set as the secure information, and then a masking image $X_2$ can be constructed to mask and offset $X_1$. In this way, the spectator can only see a black screen or some meaningless pictures $Y_1$ instead of the secure information. At the same time, users can obtain the secure picture $X_1$ using the modulation glasses having the polarization matching $X_1$. If the naked-eye view is set to be a blank gray screen, $X_2$ can be set as complementary to $X_1$. That is, $X_2=C-X_1$, wherein C is a constant. From this equation the modulated view can be easily obtained as:

$$X_1+X_2=X_1+C-X_1=C$$

In some embodiments, it may be suitable to select $X_2$ such that the naked-eye view may appear to be a meaningful mask image, thereby causing confusions to the spectators. However, the equation $Y_0=X_1+X_2$ does not have a solution when $X_1$ is greater than $Y_0$. In general the naked-eye view can be arbitrarily selected, because the system is designed to protect the modulated view $X_1$ rather than provide a high quality mask image $Y_0$. As such, the pixels of the mask image can be made darker than $X_1$. In some embodiments, if the pixel gray scale value dynamic range is [0, 255], the naked-eye view $Y_0$ can be mapped to [128, 255], and $X_1$ can be mapped to between [0, 127], so that all the values of $X_1$ are smaller than $Y_0$, to ensure that $X_2=C-X_1$ always has a solution.

In the display method and apparatus, the luminance modulation region corresponds to adjacent odd and even lines, pre-set such that only the even row luminance is selected for luminance modulation. When viewed with the naked eyes, the odd-numbered and even-numbered lines belonging to the same luminance modulation region correspond to the smallest units of the naked-eye view. That is, the sum of the luminance of the odd lines and even lines belonging to the same luminance modulation luminance region is the minimum unit sensed in the naked-eye view.

If the luminance modulation method is not limited, in principle, considering the presence of the group K (wherein K is a positive integer) modulated view $Y \in \mathfrak{R}^{N \times K}$ and the accompanying naked-eye view $y_0 \in \mathfrak{R}^N$, in the following the base image X and each of the number of K modulation weight vector W can be calculated so as to satisfy the equation $Y=XW$, or $y_0=x_1w_1+\ldots+x_kw_k$. This problem can be solved by the following two steps. First, under the prerequisite of the predetermined modulated view and naked-eye view, the base image X and the modulation weight vector W can be solved. Subsequently X and W can be obtained, and $Y=XW$. Solving this equation does not necessarily yield a single solution. In some preferred approaches, for any reversible matrix $D \in \mathfrak{R}^{N \times K}$, it can be obtained that $XDD^{-1}W=XW$. In the second step, let $\tilde{X}=XD$, $\tilde{W}=D^{-1}W$. In particular, D can be selected to be a diagonal matrix $D=\text{diag}(c_1,c_2)$ Based on the foregoing formula it can be generated $\tilde{x}=c_ix_i$, and then the base image $\tilde{X}$ associated with the naked-eye view can be expressed as $y_0=c_1x_1+c_2x_2$. In other words, the naked-eye view $Y_0$ can be approximated as a linear combination of X drawn from Step 1 above. Diagonal elements $c_1$, $c_2$ can be obtained by solving the following constrained least squares problem:

$$\min_c \|y_0 - Xc\|_2^2, c \geq 0.$$

Results C can produce D, and therefore need the basic image matrix $\tilde{X}$ and the corresponding modulation matrix $\tilde{W}$ to simultaneously generate K target modulated views and expected naked-eye views. Note that the constraint condition $c \geq 0$ can ensure matrices $\tilde{X}$ and $\tilde{W}$ to be non-negative. Wherein Y represents K groups of modulated views, X represents M groups of base views, W represents weight factors corresponding to the K groups of modulated views.

The display methods according to some embodiments can be realized by a mobile terminal operating system such as an Android operating system an Apple iOS operating system, or any other operating systems. The following description provides an example of a player having an Android system employing a polarization interlaced display that supports the display methods, including the following specific implementation steps:

Odd-numbered rows of pixels of the display apparatus deliver useful information, and the even-numbered rows of pixels deliver the interference information. Without wearing the matching glasses, the useful information cannot be obtained. With glasses that receive the odd-numbered rows of pixels, the useful information can be viewed.

The player system can have two applications: video playback and picture viewing. These are typically the most widely used functions, and it is desirable to secure some of the content in some situations. For example, if there are someone else nearby, the user can still browse pictures or watch videos on the screen. When the user starts the player system, the secure display mode can be activated, and if there is no specific modulation glasses (i.e., the auxiliary viewing device), onlookers can only see a blank screen or some camouflage images, while the user can continue to use the modulation glasses to view the secure information on the screen without having to worry about personal privacy will be compromised. There are many other occasions and applications where information security is required, and the display methods displayed herein can be expanded to many different applications. The following describes only the main flow of the secure player system, and then describes some of the technologies to achieve specific player systems, including the realization of video playback, the hiding functions, and some specific features of the player system.

Figure 5:
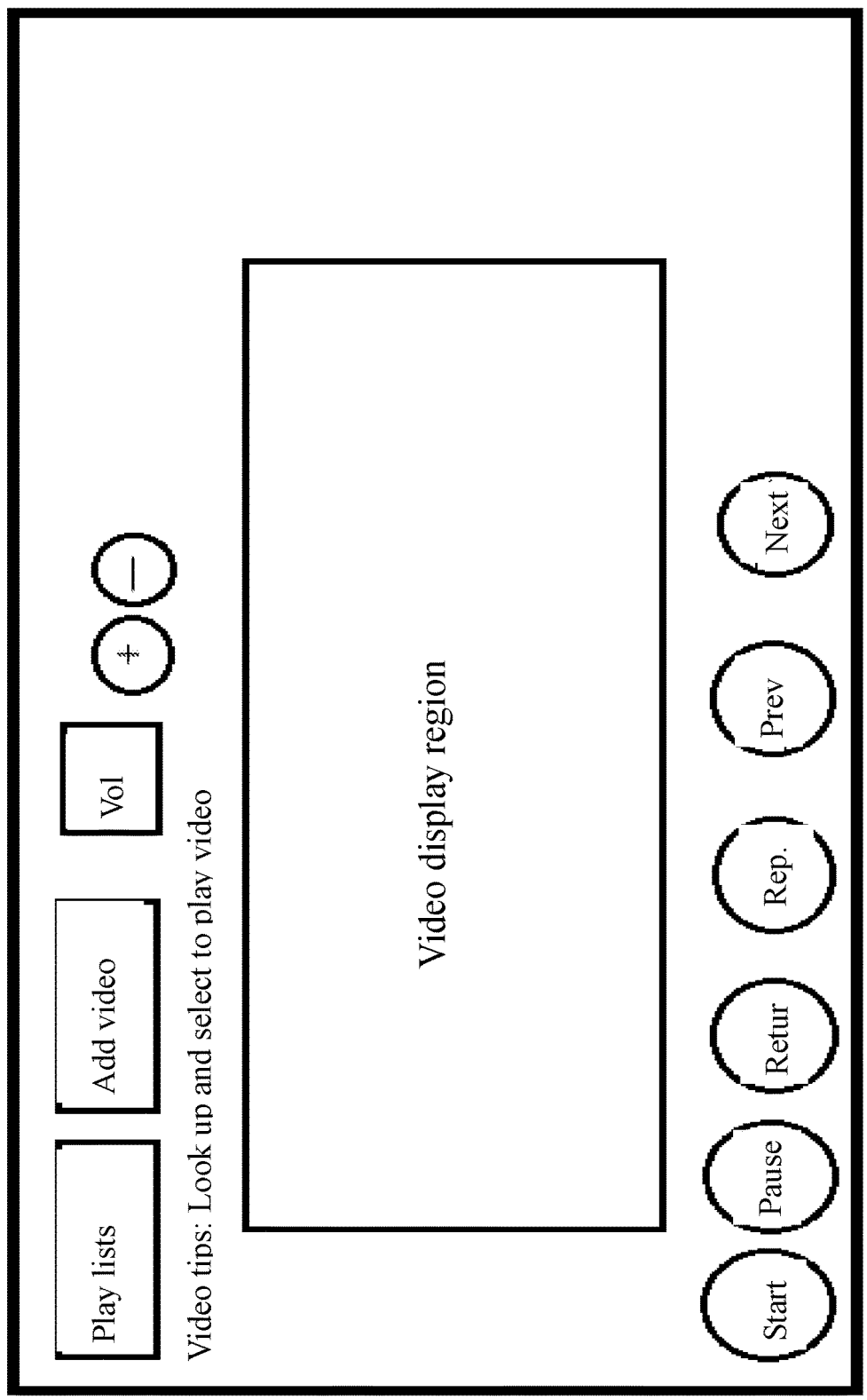
FIG. 5 is a block diagram of a video player application of a video play system according to a second embodiment.

The video player interface is the first interface presented to the user after the player system starts operating. As such, the interface should follow the principle of simple and practical graphical interface, can also minimize the consumption of system resources by the interface program. The design of the display system of the player can include play/pause functions, show listings, progress bars, volume display and adjustment, and video channel switching and other basic control functions, meeting the basic needs for interacting with the system. An example player interface is shown in FIG. 5.

Figure 6:
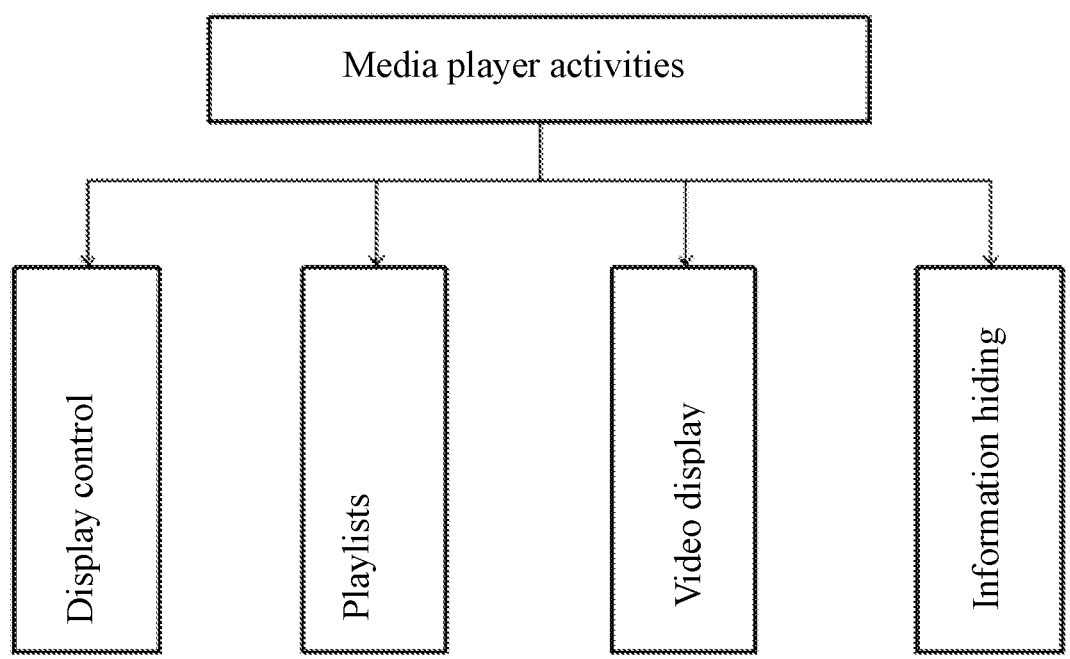
FIG. 6 is a block diagram illustrating media play activity of the media player in the video player system according to the second embodiment.

FIG. 6 is a block diagram illustrating the Media Player Activity (player media operations) of the player system, including the control display, playlists, video playback, and information hiding.

The Media Player Activity (MPA) can have its life cycle realized in the following flow. First, when the MPA is first created, OnCreat( ) function is called. For example, the main view picture is displayed, and a ContentView is set as a container of the whole interface control functions. In Android operating system, the main view is displayed through the function SetContentView( ). In XML, control functions corresponding to the view controls can be set, and can be associated with the corresponding ID. Monitors of the control functions can be set. Different monitors correspond to different control functions. For example, the progress bar can be set with SetonSeekBarChangeListener. Because MPA includes different types of Intent, multiple Handlers may be needed.

The event Intent can be received and processed by EventHandler. The view Intent can be received and processed by ViewHandler.

Prior to interacting with a user, MPA calls the Onstart( ) function, and AudioManager can be initialized in the Onstart(t) function.

When the user is about to interact with the interface, OnResume( ) function can be called. By calling the methods in Service, getAlbumld( ), getTrackld( ), the MMPA can obtain information from IPlayBackservice of Service. The information is about the video being played. In addition, when it is determined that the video file is in the SD card, then relevant information is displayed. The play/pause buttons can be continuously refreshed.

When the MPA interface is partially displayed, OnPause( ) function can be called.

When the main interface is switched to other interfaces, OnStop( ) function can be called, and MPA is no longer displayed on the main screen.

When MPA components are destroyed, OnDestroy( ) function can be called.

To realize the basic video play and pause functions of the video player, a monitor can be registered in Service to control the play/pause buttons. For example, in any state of the medium player, is Playing function can be called from the mediaPlayer interface, to determine whether the media playing is being performed. If the media playing is ongoing, the pause function can be called to pause the media, and the state is set as "pause." If the media player is in the "pause" state, the "start" function can be called to start playing the media, and the state can then be set as "start".

The "previous/next" video functions can be realized by setting a monitor function for the "previous" and "next" buttons. To realize the "Previous" video function, the player first obtains the length L of the playlist, and the location value is set as s, and the video being played in the playlist has a location value s−1. If the video being played has a current location s−1>=0, then by calling the setVideoPath function, the video being played can have its position reset. If the video being played is the first video in the playlist, then its location value is s−1. If s−1<0, then setting s=L−1. In other words, when selecting the "Previous" video button, it actually jumps to the last video in the video playlist, and then the setVideoPath function is employed again to reset the video locations.

To realize the "Next" video function, the process is similar to that of the "Previous" video function. Specifically, the player first obtains the length L of the playlist, and the location value is set as s, and the video being played in the playlist has a location value s+1. If the video being played has a current location s+1<L, then by calling the setVideoPath function, the video being played can have its position reset as s+1. If s+1>=L, then setting s=0. In other words, when selecting the "Next" video button, it actually jumps to the first video in the video playlist from the last video.

The player volume control can be realized by calling AudioManager class in the android.Media package. Adjusting the volume can be realized by: in Service class, employ setOnVolumeChangeListener in SoundView class to set the event monitor, to continuously monitor the changes in the volume. To refresh the volume value, updateVolume (int index) in setYourVolume can be called. The setYourVolume belongs to the OnVolumeChangedListener interface, and realized in the monitor events.

The progress bar can be defined using SeekBar in the setup file main.xml. In main.xml, define the width and height of SeekBar as the size of the filling window, and a space of 5 dp can be placed at the left side of SeekBar, and a 4 dp place can be disposed at the right side. When SeekBar is at the beginning position of the progress bar, the "progress" value can be set to be 0. Other attributes of SeekBar can be set in the program, such as the starting point, the displayed color at the end, etc. To present the progress of the video play in more detail, "TextView" can be set at both sides of SeekBar. The two TextView respectively present the video play start time and the total play time.

To keep SeekBar always consistent with the progress of the video play, SeekBar needs to be refreshed synchronously. This function can also be realized by setting monitor events. The player continuously monitor SeekBar, to realize the continuous refreshing of SeekBar. Generally refreshing SeekBar can be realized through onStartTrackingTouch, and the pointer position of SeekBar can be changed. The refreshing of the progress bar can be realized in the monitoring events. Two situations can trigger monitoring events. For example, the user can manually move the pointer on the progress bar to adjust the progress to realize the update. After the SeekBar position is changed, onStopTrackingTouch can be used to update SeekBar.

To make the naked-eye onlookers only see a blank gray screen, while the authorized user wearing the modulation glasses has access to the complete hidden information, as described above, the naked-eye view $Y_0=X_1+X_2$. can be set to a constant. For an 8-bit display device, each color can be represented with a grayscale values from 0 to 255. As such, it is possible to direct the screen such that the $X_2$ picture equals the negated gray scale values of the hidden image $X_1$, and the resulting sum is a constant. In practice, the effect of information hiding in this approach may not be ideal. This may be due to that the luminance and the pixel values are not in a linear relationship. That is, the RGB gray scale values and the luminance values are not linear. As such, adjustments may be made, and $Y_0=X_1=X_2$. can be calculated in the luminance range, and then the results can be mapped back to gray scale space.

To realize the hiding functions, specific procedures may include the following: through the Android system texture view control file (TextureView), obtaining the video stream to be processed (modulated view), then obtaining the SurfaceTexture for rendering content. Specifically, first the objects TextureView can be created, realizing the SurfaceTextureListener interface.

Next, in the onSurfaceTextureUpdated function, get every frame of the video using the getBitmap method of textureView, perform pixel processing on the video frames as need. For example, each odd-numbered row of pixels in each frame are preserved to be unchanged, the pixels of even-numbered rows are mapped into luminance values. The luminance values, after negation, are remapped back. The processed video stream can then be buffered through the control software View to draw the program pictures, rendering the video stream that has been processed with the concealment functions, in the video playback window.

Of course, if in the luminance modulation method, the modulation of each base composition group in the luminance modulation region is not limited, in principle there an infinite number of image modulation methods. For example, if a pixel luminance modulation region includes four rows of pixels, the modulation weight vectors are $K_1$, $K_2$, $K_3$, $K_4$, respectively for these four rows, through the auxiliary viewing device (e.g., the optical modulation device) corresponding to the modulation weight vectors, the viewed picture is $Y=K_1X_1+K_2X_2+K_3X_3+K_4X_4$. In principle, for how a number of groups of modulation weight vectors, there are the same number of modulated views. The naked-eye view of the screen is: $Y_0=X_1+X_2+X_3+X_4$.

The following examples provide some other embodiments of the display system.

Figure 7:
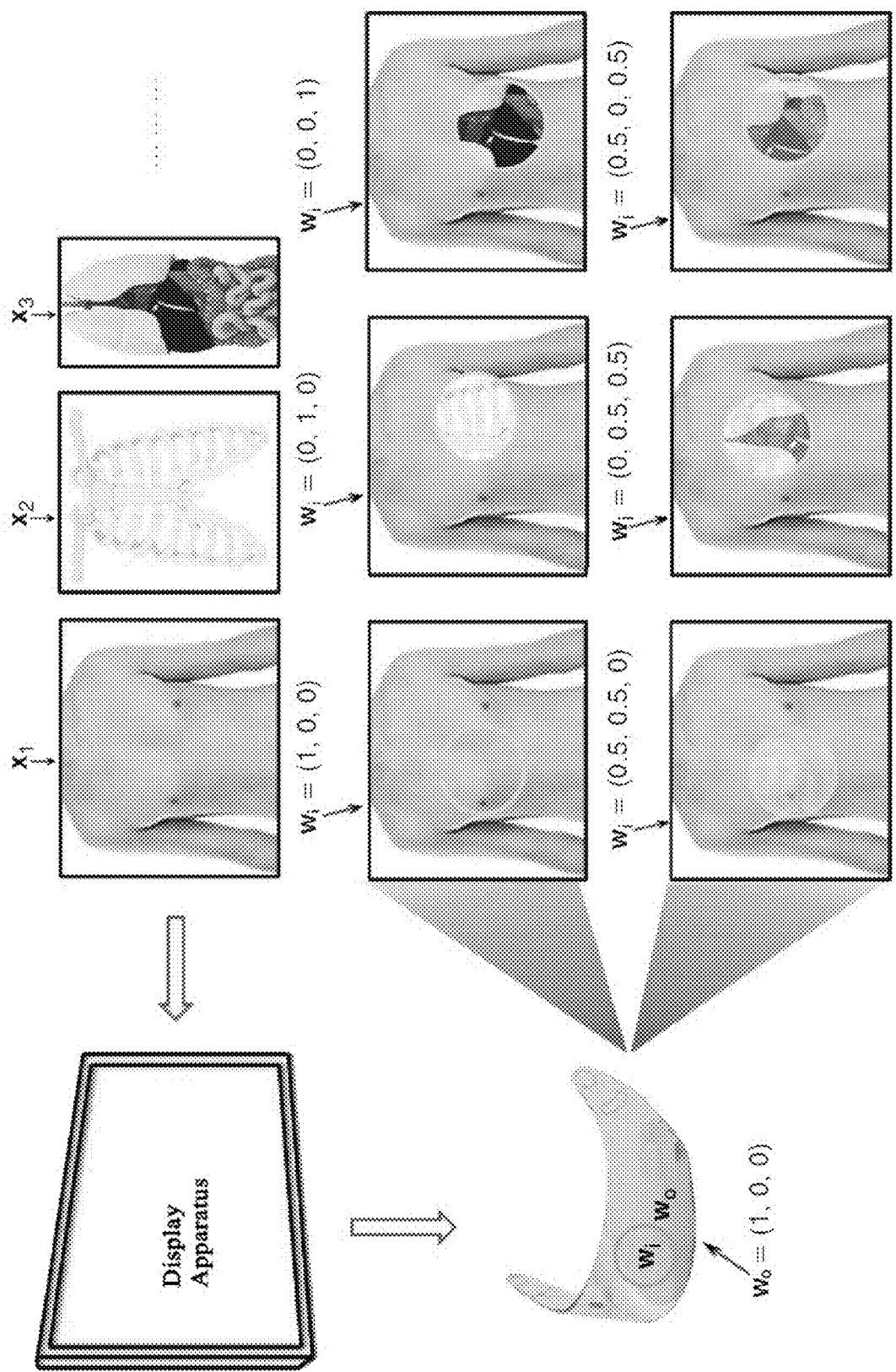
FIG. 7 illustrates the display apparatus for medical teaching or medical practice according to some implementations.

In some embodiments, in the same screen multiple views can be formed without disturbing each other. This function adds an application on the social dimension: Virtual Reality (VR), Augmented Reality (AR), and visualization. The display apparatus according to some embodiments can show different views to multiple users in real-time, realizing a productive collaborative research and learning platform. For example, as shown in FIG. 7, when a group of physicians talk face to face for different cases, everyone can independently explore the patient's anatomy in one's own 3D perspective, while exchanging ideas with colleagues. Groups research like this in a virtual environment with the shared physical medium is more difficult, if possible at all, to realize in existing VR and AR devices, because these devices can only display an image on one screen.

When the multi-layer registered human anatomy image is mapped to the base frames, and is looped in high-speed cycles to display to the doctors and students, everyone of these users can observe through their own modulating glasses. The surface of the modulation glasses can be divided into inner and outer zones, respectively assigned with modulation weight vectors $w_i=(w_{i1},w_{i2})\in[0,1]^K$, $w_o=(w_{o1},w_{o2})\in[0,1]^K$. Because the light at the polarization directions can be decomposed into transverse vector x and longitudinal vector y, provided that the original polarized light is Z, then $Z=x \cos \theta + y \sin \theta$, where $\theta$ is the angle between the transverse and the longitudinal polarization components, where $\sin^2 \theta + \cos^2 \theta = 1$, and the modulation weight factors satisfy $w_i^2 + w_o^2 = 1$. By selecting different $w_i$ and $w_o$, a viewer can see a different perspective of the anatomy. For example, by setting $w_i=(0,1)$ and $w_o=(1,0)$, the user can see the selected internal organs. By adjusting the modulation vectors of the synchronous display modulation glasses, it can also be simple to complete a mixing of different anatomical layers. Similarly, the display apparatus S according to some embodiments can also be applied to raw 3D visualization of volume data sets. 3D body slices $X_1$, $X_2$, can be looped in a high-speed and shown on the screen. The synchronous display modulation eyeglasses can adopt common-center varying modulation mode (as illustrated in FIG. 7, i.e., the center of the glasses has adjustable weights factors). In this case the display apparatus provides a 3D body (deep mosaic) funnel "dig in" view.

When the basic images are displayed in a high speed without decay, a picture can also become a view of the superposition of all the basic images depicted by the human visual system, i.e., without any modulation observation device to observe, the naked-eye view is $Y_0=X_1+X_2$. This is the daily visual experience without the display apparatus or the interference light. Correspondingly, after the luminance modulation with varying weight factors, the perceived image is the modulated view.

Figure 8:
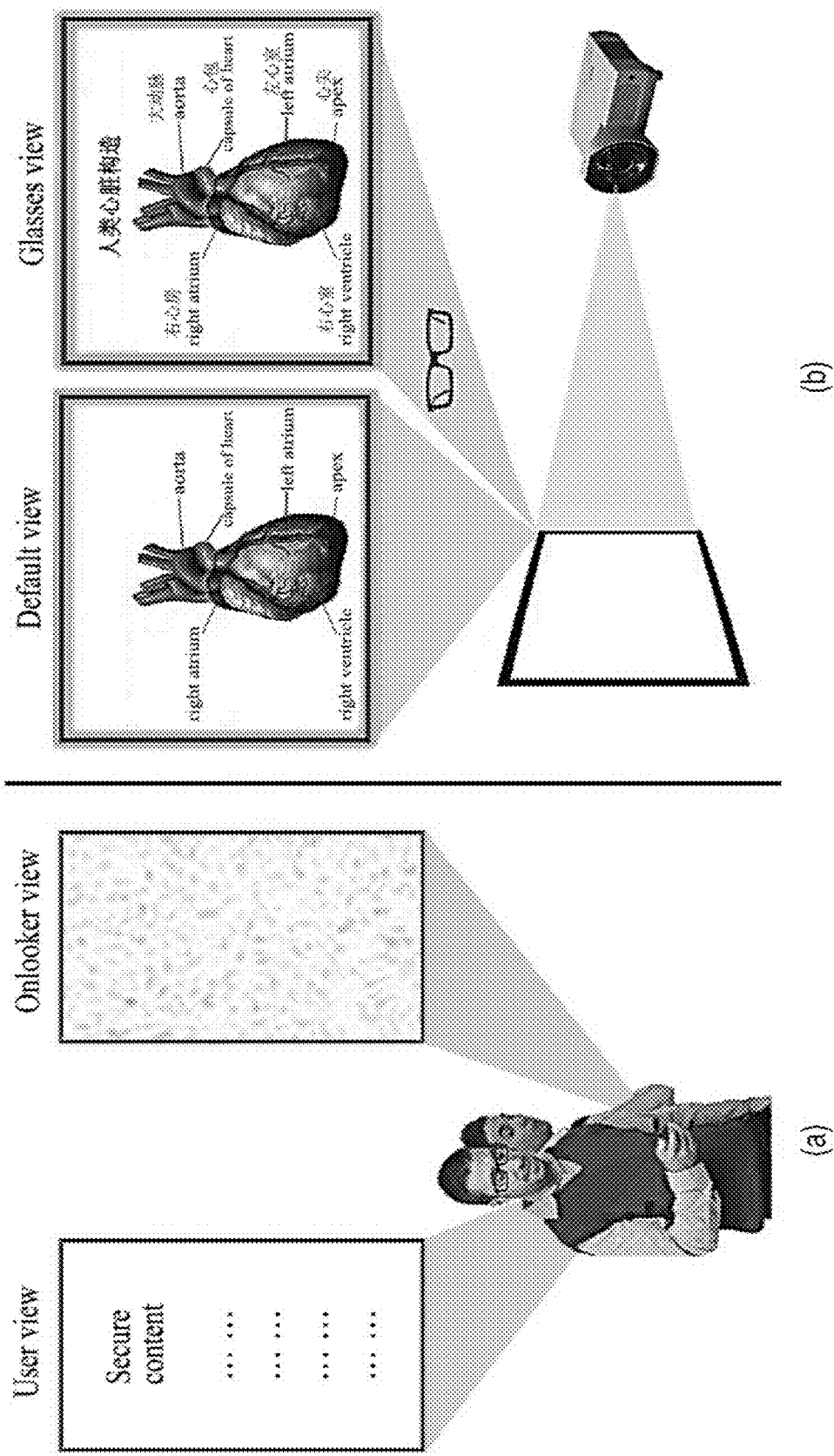
FIG. 8 illustrates an implementation of the second embodiment wherein when the presenter show the audience the PPT using the display apparatus, the notes can be hidden from the audience.

Unlike the secure display applications where information hiding is often needed, the naked-eye view can be the default view for most onlookers or temporary observers. The modulated view can meet the needs of one or more authorized users in some applications to share the screen. For example, as illustrated in FIG. 8, a presenter (such as a conference speaker, a teacher, a politician, an artist, etc.) in the slide show often wants to see his or her own notes without other people ever noticing these notes. In this case, various embodiments disclosed herein can have the private notes projected onto a screen, and only the presenter can see the private notes, which are not visible to the audience such as by made totally transparent. In this case, the naked-eye view is for the audience, while the presenter can see the annotated modulated views through the luminance modulation device. In some embodiments, the display apparatus can also be configured for multilingual presentations. For example, the naked-eye view can show an international language, such as English, while the modulated view can show other different languages, such as Korean, and the corresponding auxiliary viewing devices are provided to the users in need.

Those of ordinary skill in the art will recognize that the functional blocks, methods, devices, and systems described in the present disclosure may be integrated or divided into different combinations of systems, devices, and functional blocks. Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. Various embodiments disclosed herein can be realized via hardware and/or software, such a computer program stored on a memory. For example, a tangible, non-transitory, computer-readable storage medium having instructions stored thereon that, when executed by one or more processors, cause the one or more processors to perform operations including the steps described above.

The memory or storage medium may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media such as non-transitory computer-readable medium suitable for storing instructions for execution by the processor. The software instructions can also be contained in, and provided as, an electronic signal, for example in the form of software as a service (SaaS) delivered from a server (e.g., a distributed system and/or a cloud computing system).

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display method, comprising:
   processing a plurality of images to form base compositions; and
   presenting the base compositions with different images in a spatial arrangement which as a whole form a composite image viewable to a naked-eye viewer;
   wherein:
   a subset of the plurality of images are selectively viewable as a modulated view to a user with an optical modulation device;
   wherein the presenting base compositions with different images in the spatial arrangement comprises presenting the base composition containing different images according to a display pixel row arrangement;
   the presenting the base compositions containing different images according to a display pixel row arrangement comprises:
   presenting a first group of the base compositions at odd-numbered rows of pixels; and
   presenting a second group of the base compositions at even-numbered rows of pixels;
   luminance of the even-numbered rows of pixels correspond to the modulated view; and
   a sum of the luminance of the even-numbered rows of pixels and luminance of odd-numbered rows of pixels adjacent to the even-numbered rows of pixels correspond to the composite image;
   the method further comprising:
   obtaining pixel gray scale values $X_1$ corresponding to the even-numbered rows of pixels;
   mapping the $X_1$ into $X_1'$ in a luminance domain;
   obtaining pixel gray scale values $Y_0$ of the composite image corresponding to the odd-numbered rows of pixels and the even-numbered rows of pixels in luminance modulation regions; and
   mapping $Y_0$ into C in the luminance domain; wherein C is a constant.

2. The method of claim 1, further comprising:
   in the luminance domain, calculating luminance values $X_2'$ corresponding to the odd-numbered rows of pixels in the luminance modulation regions, wherein $X_2'=C-X_1'$; and
   mapping $X_2'$ into $X_2$ in a gray scale domain, wherein $X_2$ are gray scale values of the odd-numbered rows of pixels, wherein $X_1'$ and $X_2'$ are non-negative values.

3. The method of claim 2, wherein:
   $X_1$ have a dynamic range defined in a second gray scale region;
   $Y_0$ have a dynamic range defined in a first gray region;
   values contained in the first gray scale region are all greater than values contained in the second gray scale region; and
   the values of the first and second gray scale regions constitute the gray scale domain.

4. The method of claim 3, wherein:
   $Y_0$, $X_1$, and $X_2$ together have a dynamic range of [0, 255];
   $Y_0$ have a dynamic range limited to [128, 255]; and
   $X_1$ have a dynamic range limited to [0, 127].

5. The method of claim 4, wherein the composite image is a gray scale image configured to conceal the modulated view.

6. The method of claim 1, wherein the composite image is an apparently meaningful image to the naked-eye viewer.

7. The method of claim 6, further comprising:
   dividing the base compositions into a plurality of regions; and
   modulating pixel luminance in at least some of the plurality of regions to form the luminance modulation regions;
   wherein the optical modulation device is configured to integrate at least some of the plurality of regions into the modulated view.

8. The method of claim 7, further comprising:
providing the composite image without modulating pixel luminance to form a disguise view;
wherein the disguise view is different from the modulated view.

9. The method of claim 7, wherein the modulating pixel luminance in at least some of the plurality of regions comprises:
providing a weight vector W, wherein:
the base compositions are expressed as $X_1, X_2, \ldots, X_M$;
W has N rows and M columns, and comprises M×N weight factors;
M corresponds to a number of the base compositions; and
N corresponds to a number of different optical modulation devices.

10. A tangible, non-transitory, computer-readable storage medium having instructions stored thereon that, when executed by one or more processors, cause the one or more processors to perform operations including:
processing a plurality of images to form base compositions; and
presenting the base compositions with different images in a spatial arrangement which as a whole form a composite image viewable to a naked-eye viewer;
wherein:
a subset of the plurality of images are selectively viewable as a modulated view to a user with an optical modulation device;
wherein the presenting base compositions with different images in the spatial arrangement comprises presenting the base composition containing different images according to a display pixel row arrangement;
the presenting the base compositions containing different images according to a display pixel row arrangement comprises:
presenting a first group of the base compositions at odd-numbered rows of pixels; and
presenting a second group of the base compositions at even-numbered rows of pixels;
luminance of the even-numbered rows of pixels correspond to the modulated view; and
a sum of the luminance of the even-numbered rows of pixels and luminance of odd-numbered rows of pixels adjacent to the even-numbered rows of pixels correspond to the composite image;
the operations further comprising:
obtaining pixel gray scale values $X_1$ corresponding to the even-numbered rows of pixels;
mapping the $X_1$ into $X_1'$ in a luminance domain;
obtaining pixel gray scale values $Y_0$ of the composite image corresponding to the odd-numbered rows of pixels and the even-numbered rows of pixels in luminance modulation regions; and
mapping $Y_0$ into C in the luminance domain; wherein C is a constant.

11. The computer-readable storage medium of claim 10, further including instructions stored thereon that, when executed by the one or more processors, cause the one or more processors to perform additional operations including:
dividing the base compositions into a plurality of regions; and
modulating pixel luminance in at least some of the plurality of regions to form a plurality of luminance modulation regions;
wherein:
the optical modulation device is configured to integrate at least some of the plurality of regions into the modulated view;
the modulating pixel luminance in at least some of the plurality of regions comprises:
providing a weight vector W, wherein:
the base compositions are expressed as $X_1, X_2, \ldots, X_M$;
W has N rows and M columns, and comprises M×N weight factors;
M corresponds to a number of the base compositions; and
N corresponds to a number of different optical modulation devices.

12. A display apparatus, comprising a plurality of pixels and configured to realize operations including:
processing a plurality of images to form base compositions; and
presenting the base compositions with different images in a spatial arrangement which as a whole form a composite image viewable to a naked-eye viewer;
wherein:
a subset of the plurality of images are selectively viewable as a modulated view to a user with an optical modulation device;
wherein the presenting base compositions with different images in the spatial arrangement comprises presenting the base composition containing different images according to a display pixel row arrangement;
the presenting the base compositions containing different images according to a display pixel row arrangement comprises:
presenting a first group of the base compositions at odd-numbered rows of pixels; and
presenting a second group of the base compositions at even-numbered rows of pixels;
luminance of the even-numbered rows of pixels correspond to the modulated view; and
a sum of the luminance of the even-numbered rows of pixels and luminance of odd-numbered rows of pixels adjacent to the even-numbered rows of pixels correspond to the composite image;
the operations further comprising:
obtaining pixel gray scale values $X_1$ corresponding to the even-numbered rows of pixels;
mapping the $X_1$ into $X_1'$ in a luminance domain;
obtaining pixel gray scale values $Y_0$ of the composite image corresponding to the odd-numbered rows of pixels and the even-numbered rows of pixels in luminance modulation regions; and
mapping $Y_0$ into C in the luminance domain; wherein C is a constant.

13. A display system, comprising:
the display apparatus according to claim 12; and
the optical modulation device.

14. The system of claim 13, wherein the optical modulation device is configured to perform luminance modulation to the subset of the plurality of images to form the modulated view.

15. The system of claim 13, wherein the optical modulation device comprises at least one of optical modulation glasses, a head-up display, a helmet mounted display, a virtual reality device, and an augmented reality device.

16. The system of claim 15, wherein the display apparatus comprises an interlaced polarization display device; wherein the optical modulation device comprises optical modulation glasses with polarization directions consistent with polarization directions of even-numbered rows of pixels.

17. The system of claim 15, wherein the display apparatus comprises an interlaced polarization display device; wherein the optical modulation device comprises optical modulation glasses with polarization directions consistent with polarization directions of odd-numbered rows of pixels.

18. The computer-readable storage medium of claim 10, further including instructions stored thereon that, when executed by the one or more processors, cause the one or more processors to perform additional operations including:

in the luminance domain, calculating luminance values $X_2'$ corresponding to the odd-numbered rows of pixels in the luminance modulation regions, wherein $X_2'=C-X_1'$; and mapping $X_2'$ into $X_2$ in a gray scale domain, wherein $X_2$ are gray scale values of the odd-numbered rows of pixels, wherein $X_1'$ and $X_2'$ are non-negative values.

19. The computer-readable storage medium of claim 18, wherein:

$X_1$ have a dynamic range defined in a second gray scale region;

$Y_0$ have a dynamic range defined in a first gray region;

values contained in the first gray scale region are all greater than values contained in the second gray scale region; and the values of the first and second gray scale regions constitute the gray scale domain.

20. The computer-readable storage medium of claim 19, wherein:

$Y_0$, $X_1$, and $X_2$ together have a dynamic range of $[0, 255]$, $Y_0$ have a dynamic range limited to $[128, 255]$;

$X_1$ have a dynamic range limited to $[0, 127]$; and the composite image is a gray scale image configured to conceal the modulated view.

* * * * *